United States Patent [19]

Nguyen

[11] Patent Number: 4,842,033

[45] Date of Patent: Jun. 27, 1989

[54] PNEUMATIC TIRE HAVING GUM STRIPS ENCASING A CARCASS TURNUP

[75] Inventor: Gia V. Nguyen, Arlon, Belgium

[73] Assignee: The Goodyear Tire & Rubber Company, Akron, Ohio

[21] Appl. No.: 120,905

[22] Filed: Nov. 16, 1987

[51] Int. Cl.⁴ .............................................. B60C 15/00
[52] U.S. Cl. ................... 152/541; 152/549; 152/552; 152/554; 152/555
[58] Field of Search ............... 152/555, 552, 541, 540, 152/549, 554, 517

[56] References Cited

U.S. PATENT DOCUMENTS

| | | |
|---|---|---|
| 3,392,773 | 7/1968 | Warren et al. |
| 3,895,666 | 7/1975 | Inoue ............................ 152/555 X |
| 3,943,798 | 4/1976 | Gardner et al. ................ 152/517 X |
| 4,193,437 | 3/1980 | Powell ............................ 152/454 X |
| 4,259,218 | 3/1981 | Haws ............................. 152/565 X |
| 4,502,520 | 3/1985 | Sandstrom. |
| 4,667,722 | 5/1987 | Klepper et al. ................. 152/554 X |

FOREIGN PATENT DOCUMENTS

| | | |
|---|---|---|
| 3617880 | 12/1986 | Fed. Rep. of Germany ...... 152/555 |
| 1244050 | 8/1971 | United Kingdom. |
| 1603185 | 11/1981 | United Kingdom. |

OTHER PUBLICATIONS

Glossary of Terms Relating to Rubber and Rubber Technology (ASTM), Special Tech. Pub. 184A (1972), p. 46.

*Primary Examiner*—Michael W. Ball
*Assistant Examiner*—Jeff H. Aftergut
*Attorney, Agent, or Firm*—R. J. Slattery, III

[57] ABSTRACT

A pneumatic tire having gum strips (19,21) for encapsulation of the cut edge of a cord reinforced ply (14), in particular a carcass ply. The gum strips are formed from an elastomeric compound having physical properties such that its 300% Modulus (ASTM D412) is comprised between 5 and 7 MPa and its Shore A Hardness (ASTM D1415) is comprised between 55 and 65. It has been found that such gum strips when used in the bead portion (11) of a tire to encapsulate the ply end (18), improve the durability of the tire.

8 Claims, 3 Drawing Sheets

PNEUMATIC TIRE HAVING GUM STRIPS ENCASING A CARCASS TURNUP

BACKGROUND OF THE INVENTION

This invention relates to pneumatic tires for heavy duty use comprising a radial carcass and two bead portions each reinforced by a bead core, with the bead portion comprising a rubber apex strip of a substantially triangular cross-section extending radially outwardly from the bead core and having a Shore A Hardness (ASTM D1415) greater than 70, and with the radial carcass comprising at least one cord reinforced elastomeric ply, extending between the bead cores and passing around each bead core from the axially inner side to the axially outer side, the end portions of the carcass ply turn-up being encased in a pair of non-fiber cord reinforced gum strips.

The bead portion of a radial truck tire in use is subject to cyclic stresses and strains as the tread of the tire passes through the footprint. It is well known in the tire art that one of the most important stress points in the bead area of a tire occurs around the ply endings of the carcass plies. These stresses and strains can cause cracking and ply ending separation, that is separation of the carcass ply turn-up from the surrounding rubber compound. This separation can eventually lead to a mode of failure of the tire which is known in the trade as 'bead area failure'.

BRIEF SUMMARY OF THE INVENTION

The present invention seeks to provide a tire having an improved bead durability and in particular a tire having a bead region wherein the stresses at the ply endings of the carcass plies are greatly reduced, without reducing the needed stiffness and rigidity of the bead portion. The pneumatic tire of the present invention is characterized in that the gum strips are formed from an elastomeric compound having a Shore A Hardness (ASTM D1415) comprised between 55 and 65 and a 300% Modulus (ASTM D412) comprised between 5 and 7 MPa. It has been found that when a tire according to the invention is subject to photoelastic strain analysis that the deformation energy at the carcass ply end is greatly reduced as compared to an identical tire having its carcass ply end encased in prior art gum strips.

BRIEF DESCRIPTION OF THE DRAWINGS

The invention will be described by way of example and with reference to the accompanying drawings in which.

DESCRIPTION OF THE INVENTION

Figure 1:
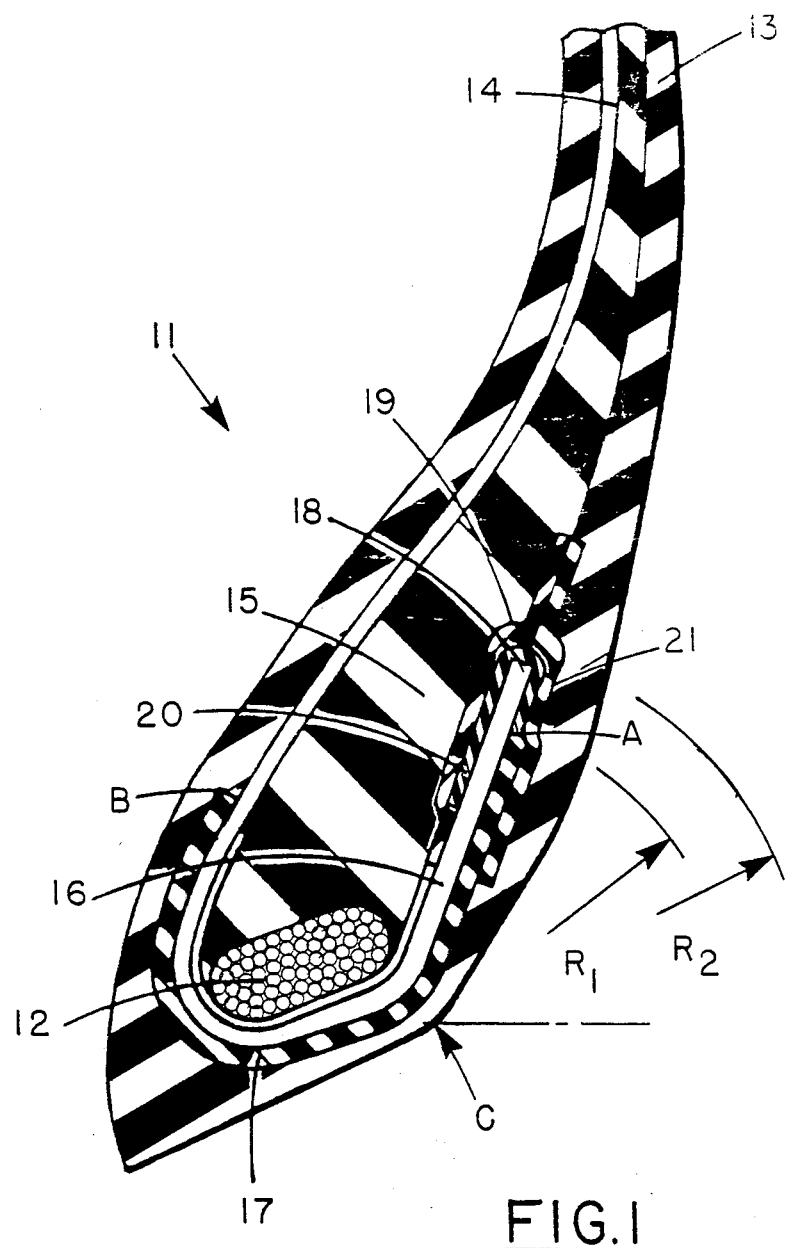
FIG. 1 is a radial cross-section through one bead portion of a radial carcass truck tire according to the invention.

With reference to FIG. 1 there is illustrated one of the two bead portions, shown generally as reference numeral 11, of a 295/75 R 22.2 radial truck tire for mounting on a drop center tubeless type rim. The tire has two bead portions 11, each reinforced by a bead core 12. The tire has a sidewall 13 which extends radially from each bead portion 11 to the tread region, not shown.

The tire has a carcass ply 14 which extends between the two bead cores 12. Each bead core 12 has a rubber apex strip 15 of a substantially triangular cross-section on its radially outer side. The terms "radial" and "radially" refer to displacements from the axis of rotation of the tire unless otherwise specified. The rubber apex strip 15 is made from a relatively hard rubber compound as is well known in the trade, having a Shore A Hardness (ASTM D1415) greater than 70. The carcass ply 14 passes around each bead core 12 from the axially inner side of the tire to the axially outer side of the tire and has a respective ply turn-up 16 that lies adjacent to the axially outer face of the rubber apex strip 15. The terms "axial" and "axially" refer to displacement along the axis of rotation of the tire.

A bead reinforcing ply 17, known as a chipper, is adjacent to the side of the carcass ply 14 which is distal from the bead core 12. The chipper 17 may be a cord reinforced elastomeric ply. The cords of the elastomeric ply may be formed from a number of suitable materials, such as nylon, steel, aramid, etc., with steel cords being the most preferred. The chipper extends from a point axially outside of the bead core 12 and on the axially outer surface of the carcass ply 14 as indicated by "A", around the bead core to an axially inner position from point "A" located on the axially inner surface of the carcass ply as indicated by "B". The point "A" is located on a radius $R_1$ which is approximately 65% of the radius $R_2$ to the carcass ply end 18, both radii being struck from the heel of the bead portion, as indicated by point "C".

The carcass ply end portion 18 of the turn-up 16 may be encased in a wrap around gum strip 20 which forms an inverted "U". Two additional gum strips 19 and 21 are also applied to encase the carcass ply turn-up. The inner gum strip 19 is located between the apex 15 and the carcass ply turn-up 16 while the outer gum strip 21 is located on the opposite side of the carcass ply from the first gum strip 19. The two gum strips 19 and 21 are joined together radially outwardly from the carcass ply end 18 and both extend radially inwardly to encapsulate at least 50% of the length of the turn-up 16. Gum strip 21 may also extend to be adjacent to and axially outward of the radially outer portion of the chipper 17.

The following example illustrates the elastomeric compounds that can be used in the present invention. The inner and outer gum strips 19,21 may be formed from an elastomeric compound based on a natural rubber (NR), polybutadiene (PBD) mix having for example the following compositions:

| | | |
|---|---|---|
| NR | 40–50 | } 100 pts |
| PBD | 60–50 | |
| Carbon Black | 45–50 phr | |
| Oil & Tackifier | 8–15 phr | |
| Zinc Oxide | 3–5 phr | |
| Sulphur, accelerator Anti-oxidants Stearic Acid | } as required | |

While in the preferred embodiment, the gum strip compound used in strips 19 and 21 is based on the above formulation, it is considered that other compounds having the required physical properties will also be suitable. In order to provide optimum endurance properties in the bead portion it is considered that the gum strip compound should have a 300% Modulus (as defined by ASTM D412) from 5 to 7 MPa and a Shore A Hardness (as defined by ASTM D1415) from 55 to 65. It is also preferable that the minimum Elongation-at-break (as defined by ASTM D3185) be from about 550 to about 700%.

Several tires, utilizing the bead portion, as illustrated in FIG. 1, were built and tested with the gum strips 19 and 21 made of the above compound. These tires were tested against control tires having the same construction as shown and described above, but using known gum strips made from a compound based on 100 parts of NR and between 35-60 phr carbon black. The known gum strip compounds had the following typical physical properties:

| | | |
|---|---|---|
| (i) | 300% Modulus ASTM D412 | 14-18 MPa |
| (ii) | Elongation-at-break ASTM D3185 | 400-550% |
| (iii) | Shore A Hardness ASTM D1415 | 65-85 |

The wrap around gum strip 20 of FIG. 1 was made of the known compound as used in the control tires. All the gum strips had a thickness of 1.0 mm.

When subjected to photoelastic strain analysis it was found that the tires according to the invention had a carcass ply end deformation energy which was approximately 50% of the ply end deformation energy for the control tire.

The tires were subject to a "bead out" test in which an inflated tire is run under load on a flywheel and periodically inspected for damage. The purpose of this test is to measure the durability of the bead regions of a tire. The "bead out" performance of a tire is measured by the distance, such as in kilometers, which the tire has covered when damage occurs. The test results are generally influenced by such parameters as the inflation pressure of the tire, the speed of rotation of the tire, the load of the tire, and the ambient temperature. For the present example the tires of the invention as well as the control tires as described above were inflated to a specified inflation pressure of 7 bar and conditioned for one hour before the test at an ambient room temperature of between 35° C. and 41° C. The tires were then run under a load of about 4500 kg on a 120 inch flywheel and rotated at a speed of 65 kilometers per hour. The tires were inspected for visible damage about every 400 kilometers. It was found that the control tires had a "bead out" performance comprised between 12.539 and 15.393 kilometers, while the tires according to the invention had a "bead out" performance comprised between 25,372 and 27.620 kilometers. This means that an average increase in "bead out" performance of about 100% has been obtained with the tires according to the invention in comparison with the control tires. This improvement was unexpected in that these results were achieved merely by changing the compounds of the gum strips.

Figure 2:
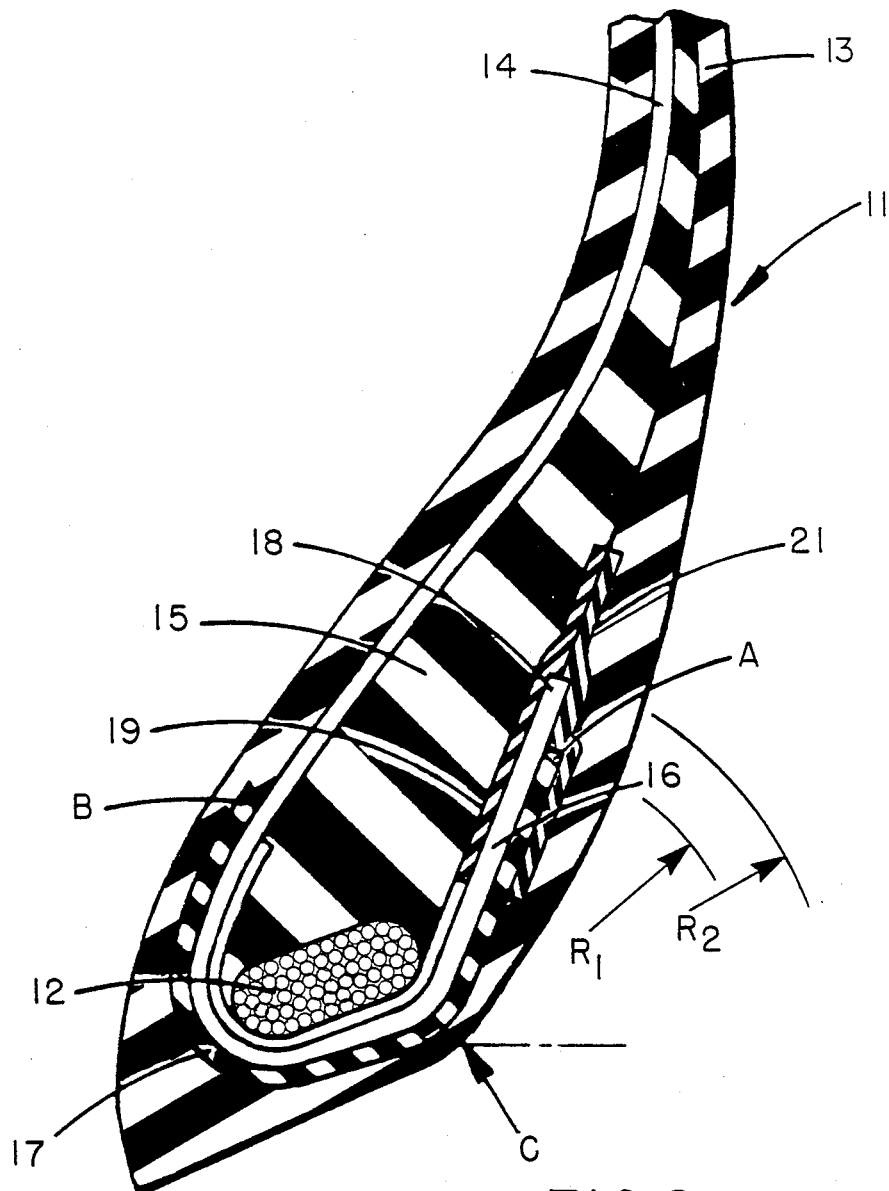
FIG. 2 is a radial cross-section through the bead portion of a second embodiment of the invention.

FIG. 2 illustrates a second embodiment of the invention. This embodiment has substantially the same construction as the tire of FIG. 1 except that the wrap around gum strip 20 has been eliminated and the thickness of the gum strips 19 and 21 has been increased to 1.75 mm. This results in the carcass ply end 18 and the turn-up 16 being encased only in a pair of gum strips 19 and 21 as set forth herein.

Several tires utilizing the bead portion and gum strips as illustrated in FIG. 2 were also built and tested. In this embodiment the bead out performance was further increased to a magnitude from between 28.800 to 35.856 kilometers. This resulted in an average improvement of about 22% over the performance of the tires described in FIG. 1.

Figure 3:
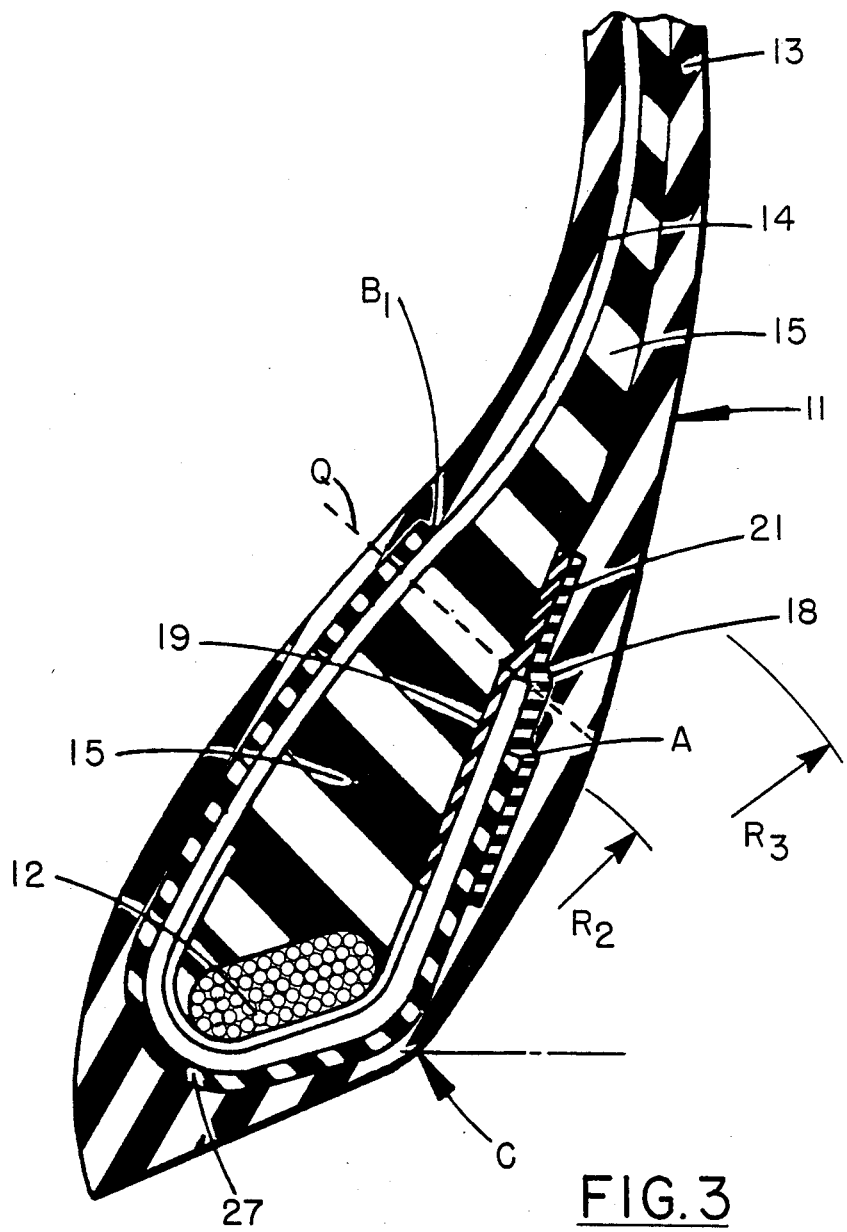
FIG. 3 is a radial cross-section through the bead portion of a third embodiment of the invention.

With reference to FIG. 3 there is illustrated a third embodiment of the invention. This embodiment has substantially the same construction as the tire of FIG. 2. But to further increase the stiffness in the bead portion 11, the bead reinforcing ply (Chipper) 27 is extended radially outwardly on the axially inner side of the bead portion 11, and the axially inner end B1 of the chipper 27 is located so that it lies on a radius R3 struck from the point C, so that R3 is about 130% of R2 the radius to the carcass ply end. The chipper 27 is arranged to extend so that the point B1 is located radially outwardly of a line Q normal to the carcass ply 14 and passing through the carcass ply end 18. The tire having the modification of the high chipper inside ending, when subject to photoelastic analysis is shown to have the advantage that the lower sidewall rotation is reduced as the tire passes through the footprint.

Preferably, the thickness of the gum strips 19 and 21 is comprised between 1.0 mm and 2.0 mm. If the gum strip thickness stays within these limits, it is provided that the gum strips 19 and 21 reduce the stresses at the carcass ply ending 18 without enhancing the flexibility of the area near the carcass ply ending 18. Therefore, a stiff bead portion 11 is retained.

These descriptions and details have been shown for the purposes of illustrating this invention and it will become apparent to those skilled in the art that various changes and/ormodifications may be made therein without departing from the original spirit or scope of the invention.

It is claimed:

1. A pneumatic tire for heavy duty use comprising a radial carcass and two bead portions each reinforced by a bead core, with the bead portion comprising a rubber apex strip of a substantially triangular cross-section extending radially outwardly from the bead core and having a Shore A Hardness greater than 70, and with the radial carcass comprising at least one cord reinforced elastomeric ply, extending between the bead cores and passing around each bead core from the axially inner side to the axially outer side, end portions of the carcass ply turn-up being encased in a pair of non-fiber cord reinforced gum strips wherein said gum strips are formed from an elastomeric compound having a Shore A Hardness comprised between 55 and 65, a 300% Modulus comprised between 5 and 7 MPa, and a minimum Elongation-at-break which is comprised between 550 and 700%; each turn-up has one of said gum strips located between said turn-up and the respective apex, and the other gum strip located axially outside of the turn-up, the two gum strips being joined together radially outwardly of the carcass ply end and extending radially inwardly to encapsulate at least 50% of the length of the turn-up, and wherein the thickness of the gum strips is comprised between 1.0 mm and 2.0 mm.

2. A pneumatic tire as set forth in claim 1 wherein there is further provided a bead reinforcing ply adjacent the carcass ply on a side thereof away from the bead core.

3. A pneumatic tire as set forth in claim 2 wherein the bead reinforcing ply extends from a first point, located at the axially outer side of the bead portion and at a radial distance from the bead heel of about 65% of the radial distance of the carcass ply end from the same point, to a second point located at the axially inner side of the bead portion and extending radially outwardly with respect to the axis of a tire.

4. A pneumatic tire as set forth in claim 3 wherein one of said gum strips extends radially inwardly to cover a radially outer adjacent end portion of the bead reinforcing ply.

5. A pneumatic tire as set forth in claim 4 wherein an additional gum strip having an inverted "U" cross-section is provided around the end portion of the turn-up, and is formed from an elastomeric compound having a Shore A Hardness between 65 and 85 and a 300% Modulus between 14 and 18 MPa, said additional gum strip being in its entirety axially disposed between the first and second gum strips.

6. A pneumatic tire as claimed in claim 6 wherein the second pint of the bead reinforcing ply is located radially outwardly at least as far as a point on the carcass ply located by a line normal to the carcass ply and which passes through the carcass ply end.

7. A pneumatic tire as set forth in claim 1 wherein an additional gum strip having aninverted 'U' cross-section is provided around the end portion of the turn-up, and is formed from an elastomeric compound having a Shore A Hardness between 65 and 85 and a 300% Modulus between 14 and 18 MPa, said additional gum strip being in its entirety axially disposed between the first and second gum strips.

8. A tire as set forth in any one of the above claims wherein the gum strip is based on an elastomeric material comprising a mixture of natural rubber and polybutadiene in a ratio from 40:60 to 50:50 respectively.

* * * * *